United States Patent [19]
Culotta et al.

[11] 4,182,158
[45] Jan. 8, 1980

[54] STATIC PRESSURE ORIFICE SYSTEM TESTING METHOD AND APPARATUS

[75] Inventors: Randolph F. Culotta; Donald L. Posey, both of Newport News, Va.

[73] Assignee: The United States of America as represented by the Administrator of the National Aeronautics and Space Administration, Washington, D.C.

[21] Appl. No.: 934,576

[22] Filed: Aug. 17, 1978

[51] Int. Cl.² ............................................. G01M 3/26
[52] U.S. Cl. ........................................ 73/40; 73/4 R
[58] Field of Search ................. 73/40, 49.7, 49.8, 4 R, 73/147

[56] References Cited
U.S. PATENT DOCUMENTS
3,518,870  7/1970  Shubert et al. .................... 73/4 R X

*Primary Examiner*—Gerald Goldberg
*Assistant Examiner*—Joseph W. Roskos
*Attorney, Agent, or Firm*—Wallace J. Nelson; John R. Manning; Howard J. Osborn

[57] ABSTRACT

A method and apparatus for pressure testing the static pressure orifices and associated connections used in wind tunnels. A cylindrical module, having in one end an open hemispherical calibration pressure chamber separated from and surrounded by an annular vacuum chamber, is placed over the orifice of the system to be tested. O-rings ensure seating and a vacuum seal between the chambered end of the module and the surface around the orifice: one O-ring separates the two chambers and another separates the outer chamber from the outside environment. Ports lead from each of the chambers out the other end of the module to tubes connected to a control box consisting of calibration pressure and vacuum supply lines, bleeder valves, and guages. The calibration pressure supply may be above or below atmospheric pressure. The vacuum chamber is evacuated to seat the module and seal off the system, the center chamber is pressurized, and the control box pressure guage is monitored for changes which would indicate leaks in the system. Comparison against the control box pressure guage allows for calibration of the orifice system pressure receiving guage.

10 Claims, 3 Drawing Figures

STATIC PRESSURE ORIFICE SYSTEM TESTING METHOD AND APPARATUS

ORIGIN OF THE DISCLOSURE

The invention described herein was made by an employee and a former employee, respectively, of the United States Government and may be manufactured and used by or for the Government for governmental purposes without the payment of any royalties thereon or therefor.

BACKGROUND OF THE INVENTION

A static pressure orifice is one of the facilities for taking measurements of the forces acting on a model in a wind tunnel test. A typical orifice, of which there are a wide variety of types, ranges from 0.03 to 0.125 of an inch in diameter and is disposed in the surface of the model being tested. Static orifices are generally disposed in a plane parallel to the streamlines of the airflow over the model such that the presence thereof does not disturb the airflow stream lines. Inside the body of the model being tested, a tube leads from the orifice through the body of the model, out of the wind tunnel, to a pressure receiving gauge. When the wind tunnel is in operation, the static pressure acting on the model at the point of the static orifice is transmitted through the connecting tube to the pressure receiving gauge, and may be known by a reading of the gauge. The combination of the orifice, the connecting tube, and the pressure receiving gauge comprises a distinct "static pressure orifice system." Each orifice system functions independently. There may be hundreds of static pressure orifices in a model being wind tunnel tested, and the orifices may be spaced close together.

From the readings of a pressure gauge, or of multiple gauges taken together, are derived data on airflow characteristics, Mach numbers, pressure ratios, etc. The orifice system is one of the primary data acquisition methods in aerospace research.

Occasionally faults occur in an orifice system, such as a leak between the orifice and the connecting tube, or in the tube itself, or the system may become clogged by a solid particle strayed into the wind tunnel, or the pressure receiving gauge may lose its accuracy. If any of these conditions occur, the data obtained from reading the gauge is unreliable and essentially worthless. It is therefore necessary, when the wind tunnel is shut down for routine maintenance, to individually test each of the numerous static pressure orifice systems to ensure its integrity.

The prior art method of testing orifice systems generally requires at least two separate operations: First, orifice system pressure receiving instruments are calibrated by disconnecting the line between the orifice and the pressure receiving gauge or instrumentation. An accurate pressure indication gauge and a pressure regulator are then connected to the line going to the pressure receiving gauge or instrumentation. A calibrated pressure is then applied and the receiving instrumentation interpreted to ensure correlation of the orifice system. On completion of the calibration, the calibrated pressure gauge and pressure regulator are disconnected and the orifice and receiving instrumentation reconnected. Thus, the integrity of the orifice system has been momentarily interrupted. In doing so, the possibility of creating a leak in what was previously a secure and reliable orifice system is greatly increased, especially as there are numerous (often several hundred) connecting tubes in proximity which may be crossed. All that has really been determined is the orifice system pressure receiving instrumentation accuracy, not the total orifice system reliability.

Second, to leak check the total orifice system and ensure that the line is correctly connected and that no blockages have occurred, an additonal check is made at the orifice itself. This is usually done by using a piece of transparent plastic tubing connected to a vacuum pump and/or regulator. The tube must be hand held over the orifice and it is often difficult to acquire a satisfactory seal resulting in a loss of time and questionable check. It is also necessary to close a clamp on the tubing, and to read the vacuum gauge, which requires a second technician.

There is thus a definite need in the art for a more simple, efficient, and reliable means of testing orifice systems for leaks, blockages, and misconnections, and calibrating pressure receiving gauges.

Accordingly, it is an object of the present invention to provide an improved method of verifying that static pressure orifices are connected to their respective gauges.

It is another object of the present invention to provide an improved method of detecting leaks and blockages in a static pressure orifice system.

It is a further object of the present invention to provide an improved method of calibrating the pressure receiving gauges in a static pressure orifice system.

It is also an object of the present invention to provide an improved apparatus for verifying that static pressure orifices are connected to their respective gauges.

It is an additional object of the present invention to provide an improved apparatus for detecting leaks and blockages in a static pressure orifice system.

It is yet another object of the present invention to provide an improved apparatus for calibrating the pressure receiving gauges in a static pressure orifice system.

SUMMARY

The foregoing and other objects are attainable according to the present invention by providing a simple, one-step, method and apparatus for testing the integrity of orifice systems. The present invention is practicable on those orifice systems wherein the orifices are disposed in a flat or nearly flat surface one inch or more apart, and wherein pressure receiving gauges are to be calibrated at low pressures.

The preferred embodiment of the present invention consists of a pressure control box, connecting tubing, and a pressure chamber module. The module has a calibration pressure holding chamber and a vacuum chamber with the calibration chamber being positioned over the orifice of the system to be tested and the vacuum chamber serving to secure the module in position. The pressure control box, which is supplied by outside pressure sources, is manipulated to expose the vacuum chamber to a vacuum, thus seating the module and isolating the orifice system. The pressure control box is then manipulated to create a calibration pressure in the calibration chamber of the module, and in the orifice system. A gauge in the pressure control box is monitored to determine the pressure holding capacity of the orifice system, and the accuracy of the orifice system pressure receiving gauge can be calibrated by one technician.

As pressure is applied to the orifice system and gauge through the module, it is not necessary to disconnect the orifice system tube from the orifice, and new faults in the system will not arise.

Furthermore, the use of the pressure-chamber module, in contrast to the prior art method, ensures a seal over the orifice and gives a meaningful test for leaks around the orifice itself.

The simplicity of this novel procedure reduces opportunities for errors and is much more expeditious than the prior art method. This is especially important as there are typically hundreds of orifice systems to be checked in a given wind tunnel.

A more complete appreciation of the invention and many of the attendant advantages thereof will be readily apparent as the same becomes better understood by reference to the following description when considered in connection with the accompanying drawings wherein:

DETAILED DESCRIPTION OF THE PREFERRED EMBODIMENT

Figure 1:
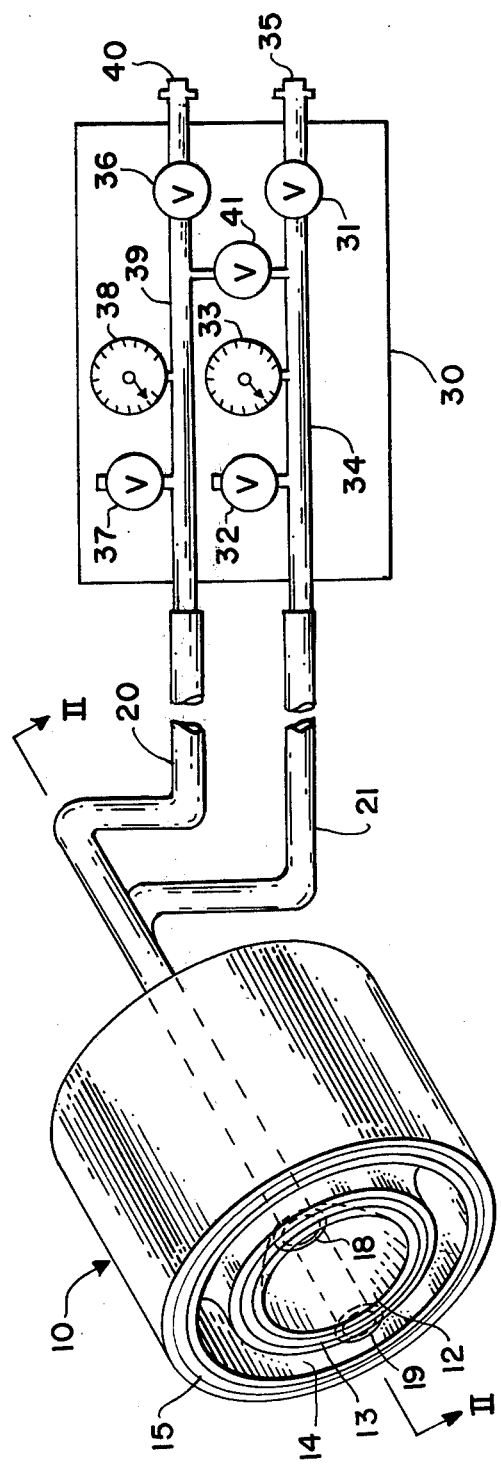
FIG. 1 is a perspective view of the preferred embodiment of the pressure chamber module along with a schematic diagram of the control box according to the present invention.
Figure 2:
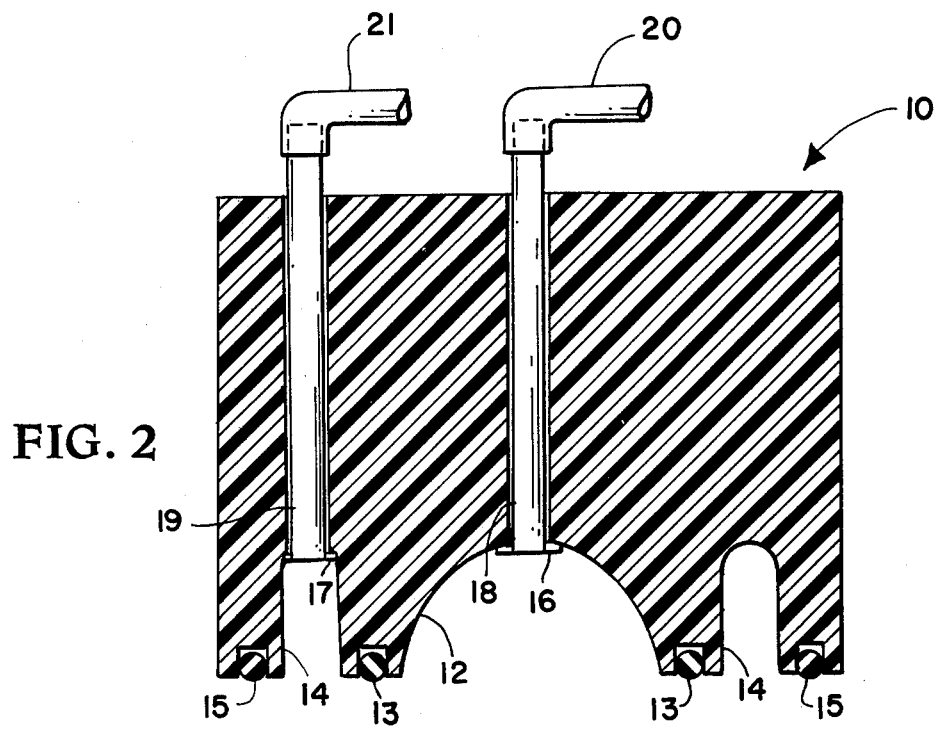
FIG. 2 is a cross-sectional elevation of the pressure chamber module taken along lines II—II of FIG. 1 and FIG. 3.
Figure 3:
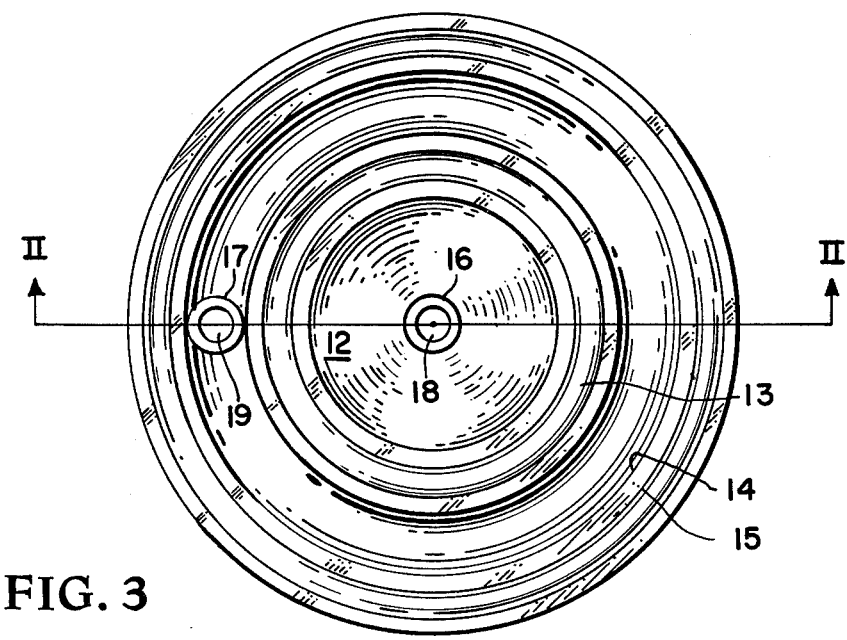
FIG. 3 is an end view of the pressure chamber module of the present invention shown in FIG. 1.

Referring now to the drawings, the pressure-chamber module, generally designated by reference number 10, has a center hemispherical pressure holding calibration chamber 12, which is designed to be placed over the orifice to be tested. The calibration pressure chamber 12 is circumscribed and sealed off by an O-ring, 13. On the outside of 0-ring 13 is an annular vacuum chamber 14 circumscribed by a second O-ring 15. Calibration pressure chamber 12 communicates through shaft 18, which is disposed in port 16, to supply-line 20. Vacuum chamber 14 communicates through shaft 19, disposed in port 17, to supply-line 21. The radius of the module must be less than the distance between the orifices to be tested.

The calibration pressure vacuum supply lines are connected to a pressure control box shown schematically in FIG. 1 and generally designated by reference number 30. The module 10, supply-lines 20 and 21, and control box 30 together comprise the orifice system testing device. The control box 30 houses a vacuum supply shut-off valve 31, vacuum bleeder valve 32, vacuum shunting valve 41, a vacuum gauge 33, connecting piping 34, and a connection 35 for an outside vacuum supply pump, not shown. Control box 30 also contains a similar set of components for supplying the calibration pressure, including a pressure supply shut-off valve 36, a pressure bleeder valve 37, a pressure gauge 38, connecting piping 39, and a connection 40 for an outside pressure supply pump, not shown.

It is important that gauge 38 be accurate and sensitive, as calibration of the orifice system pressure receiving gauges will be made according to gauge 38; this gauge also being the indicator of leaks in the orifice system, which may be slight, as further explained hereinafter.

OPERATION

In operation, the vacuum and calibration pressure supply valves, 31 and 36, are closed to prevent flow through the lines to connectors 35 and 40 while the orifice system testing device is not in use, and to allow for unimpeded positioning of the module 10. The bleeder valves 32 and 37 are closed to prevent escape of the vacuum or pressure once the supply valves 31 and 36 are opened. Vacuum shunting valve 41 is also closed. The module 10 is positioned over the orifice of the orifice system to be tested. Positioning or centering of module 10 is facilitated if the module is made from transparent material as in the preferred embodiment. Vacuum supply valve 31 is then opened, creating a vacuum in chamber 14, which seats the module on the O-rings 13 and 15, and seals off the orifice system from the outside environment. If a calibration pressure above atmospheric is to be used, calibration pressure supply valve 36 is then opened to expose chamber 12 and the entire orifice system to a calibration pressure. If a given calibration pressure is desired, this may be achieved by regulating the flow through supply valve 36 and bleeder valve 37 while reading the pressure on gauge 38, or by delivering the gas to connector 40 from a calibrated pressure source. The force exerted by the calibration pressure chamber cannot exceed the strength of the vacuum. The following inequality must be respected:

$$\text{calibration pressure} < \frac{(\text{area of vacuum chamber})(\text{atmospheric pressure})}{\text{area of calibration pressure chamber}}$$

Alternatively, if a calibration pressure below atmospheric is to be used, valve 36 is left closed and vacuum shunting valve 41 is opened instead.

Once the calibration pressure has been established and stabilized, if there is a leak in the orifice system, it will be indicated by a change in the reading shown by gauge 38.

Comparison of gauge 38 with the orifice system pressure receiving gauge permits calibration of the latter. Furthermore, if the orifice is not connected to the appropriate pressure receiving gauge, this will be immediately apparent by the failure of the appropriate gauge to indicate any pressure at all.

After the determination of the integrity of the orifice system, bleeder valve 37 is opened to release the calibration pressure, bleeder valve 32 is opened to release the vacuum and thus module 10, and the testing is completed. Module 10 is ready to be moved to another orifice.

It is thus seen that the improvements in the method and apparatus of the present invention include reducing the complication, possibilities for error, and time involved to check the integrity of orifice systems.

Although the invention has been described relative to a specific embodiment thereof, it is not so limited and numerous variations and modifications thereof will be readily apparent to those skilled in the art in the light of the above teaching. For example, in the preferred embodiment the control box may remain stationary within the reach of connecting tubes 21 and 22. Alternatively, module 10 and control box 30 could be combined by reducing the length of tubes 21 and 22 to the point where shafts 18 and 19 communicate directly with the control box, thereby allowing the testing device to be constructed as a single unit. In this case the supply lines to connectors 35 and 40 would be correspondingly lengthened to allow the testing device the same range of movement. In addition, the bottom of the module 10 is flat (that is, O-rings 13 and 15 are in the same plane) in the preferred embodiment. The module is, however, functional on moderately curved surfaces, concave or convex. The module could be constructed with a concave or convex bottom surface to accomodate curved surfaces around the orifice. Although the preferred embodiment is described as having chamber 12 shaped as a hemisphere and chamber 14 as an annulus, this is merely for the sake of ease of illustration. The two chambers could have a variety of shapes, such as recessed cylindrical sections, with little or no effect on the utility of the testing device. The preferred embodiment of the module is in transparent plastic. However, if for any reason transparent material were not desired, positioning and use of the module would still be possible, albeit less convenient. It is therefore to be understood that within the scope of the appended claims the invention may be practiced otherwise than as specifically described.

What is claimed as new and desired to be secured by Letters Patent of the United States is:

1. A method of verifying the integrity of a static pressure orifice system of an orifice in a planar surface, a connecting tube, and pressure receiving gauge comprising the steps of:
   (a) providing an orifice system testing device;
   (b) employing a vacuum to secure the testing device against the planar surface and over the orifice of the orifice system to be tested to thereby isolate the orifice system from the outside environment;
   (c) applying and regulating pressurized gas through the testing device to the orifice system to be tested;
   (d) monitoring a standard gauge in the testing device to detect the presence of leaks and thereby determine the capacity of the orifice system to maintain constant pressure;
   (e) comparing the orifice system pressure receiving guage with the standard guage to calibrate the orifice system guage; and
   (f) releasing the vacuum to disengage the testing device from the orifice system.

2. The method of claim 1 including the further step of delivering the applied pressurized gas into a hemispherical chamber in the test device positioned over the plane surrounding, and opening onto, the orifice.

3. A combination for testing the integrity of an orifice system comprising:
   a testing device including means for isolating and sealing off the orifice system,
   means for applying pressure from an outside source to the orifice system,
   means for regulating pressure in the orifice system,
   means for monitoring pressure in the orifice system, and
   means for disengaging the testing device from the orifice system;
   said testing device means being distributed into
   (a) a cylindrical module,
   (b) a pressure control box connected to outside pressure sources, and
   (c) a pair of supply lines connecting said module with said control box;
   said means for isolating and sealing off the orifice system including an annular vacuum chamber recessed into an end face of said cylindrical module,
   said vacuum chamber leading to a port in the opposite end face of said module and in fluid connection with one member of said pair of supply lines,
   said one member of said pair being a vacuum supply line and disposed in fluid communication with a vacuum source,
   means for controlling the vacuum pressure disposed in said supply line, whereby the testing device is securely maintained by vacuum against the surface surrounding the orifices of the orifice system being tested, and
   means for releasing the vacuum to disengage the testing device from the orifice system.

4. The combination of claim 3 wherein the said means for controlling the vacuum pressure includes a shut-off valve contained in said control box and disposed in said vacuum supply line leading to said vacuum chamber, and a guage in said control box, disposed in said vacuum chamber supply line between said shut-off valve and said vacuum chamber, and
   said means for disengaging the testing device from the orifice system is a bleeder valve branching from said vacuum supply line in said control box connecting said shut-off valve to said vacuum chamber.

5. A combination for testing the integrity of an orifice system comprising:
   a testing device, including means for isolating and sealing off the orifice system,
   means for applying pressure from an outside source to the orifice system,
   means for regulating pressure in the orifice system,
   means for monitoring pressure in the orifice system, and
   means for disengaging the testing device from the orifice system;
   said testing device means being distributed into
   (a) a cylindrical module,
   (b) a pressure control box connected to outside pressure sources, and
   (c) a pair of supply lines connecting said module with said said control box;
   said means for isolating and sealing off the orifice system including an annular vacuum chamber recessed into an end face of said cylindrical module,
   said vacuum chamber leading to a port in the opposite end face of said module and in fluid communication with one member of said pair of supply lines,
   said one member of said pair being a vacuum supply line and disposed in fluid communication with a vacuum source,
   means for controlling the vacuum pressure disposed in said supply line, whereby the testing device is securely maintained by vacuum against the surface surrounding the orifice of the orifice system being tested; and
   said means for applying pressure to the orifice system including a hemispherical pressure-holding chamber recessed into said end face of said cylindrical module, inside and separated from said vacuum chamber, said pressure-holding chamber having a port in the opposite end face of said module and in fluid communication with the other member of said pair of supply lines, said other member of said pair also being disposed in fluid communication with a pressure supply source for applying fluid pressure through said pressure supply lines and said port into said pressure holding chamber.

6. The combination of claim 5 wherein said means for regulating pressure in the orifice system includes a set of two valves in said control box, one valve being a shut-off valve in said pressure supply line to said pressure-holding chamber, the second valve being a bleeder valve branching from said pressure supply line between said shut-off valve and said pressure holding chamber.

7. The combination of claim 6 wherein the said means for monitoring pressure in the orifice system includes: a gauge contained in said control box, said gauge being disposed in said pressure-holding chamber supply line connecting said shut-off valve to said pressure-holding chamber.

8. The combination of claim 5 including a first O-ring seal disposed along the circumference of an end face of said module serving to ensure sealing said annular chamber from the outside environment, and a second O-ring disposed interior to and spaced from said first O-ring in the end of said module and serving to separate said annular chamber from said pressure chamber and to seal said pressure chamber.

9. The combination of claim 8 wherein said O-rings are in different parallel planes, the separation of the said planes being selected such that the two rings define a surface corresponding to the surface around the orifices to be tested.

10. The combination of claim 8 wherein the said pressure chamber module is composed of a transparent material permitting visual positioning of the said module over the orifice of the system to be tested.

* * * * *